United States Patent
Satou et al.

(10) Patent No.: US 11,117,579 B2
(45) Date of Patent: Sep. 14, 2021

(54) VEHICLE SPEED CONTROL DEVICE

(71) Applicant: ISUZU MOTORS LIMITED, Tokyo (JP)

(72) Inventors: Takahiro Satou, Fujisawa (JP); Yuuta Fujimaki, Fujisawa (JP); Ryouta Okeya, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 41 days.

(21) Appl. No.: 16/627,071

(22) PCT Filed: Jun. 15, 2018

(86) PCT No.: PCT/JP2018/022877
§ 371 (c)(1),
(2) Date: Dec. 27, 2019

(87) PCT Pub. No.: WO2019/003960
PCT Pub. Date: Jan. 3, 2019

(65) Prior Publication Data
US 2020/0223437 A1    Jul. 16, 2020

(30) Foreign Application Priority Data

Jun. 27, 2017    (JP) .............................. JP2017-125249

(51) Int. Cl.
*B60W 30/16*    (2020.01)
*B60W 30/18*    (2012.01)
*G08G 1/16*    (2006.01)

(52) U.S. Cl.
CPC .... *B60W 30/162* (2013.01); *B60W 30/18009* (2013.01); *G08G 1/16* (2013.01)

(58) Field of Classification Search
CPC .. B60W 30/143; B60W 30/16; B60W 30/162; B60W 2554/40; B60W 2554/4029; B60W 2554/801; B60W 2720/10
See application file for complete search history.

(56) References Cited

U.S. PATENT DOCUMENTS

2013/0345944 A1*  12/2013  Kasiraj ............... B60W 30/162
                                                             701/96
2017/0236422 A1    8/2017  Naka et al.
(Continued)

FOREIGN PATENT DOCUMENTS

JP    2004-114906 A    4/2004
JP    2006-224740 A    8/2006
(Continued)

OTHER PUBLICATIONS

International Search Report and Written Opinion for related International Application No. PCT/JP2018/022877, dated Aug. 14, 2018; English translation of ISR provided (7 pages).
(Continued)

*Primary Examiner* — Anshul Sood
(74) *Attorney, Agent, or Firm* — Procopio, Cory, Hargreaves & Savitch LLP

(57) ABSTRACT

A vehicle speed control device 1 includes a lane detection unit 120 configured to detect a road outside line of a lane on which a host vehicle V is traveling, a target detection unit 121 configured to detect a target that is present outside the road outside line, and a speed control unit 123 configured to control a speed of the host vehicle V such that the host vehicle V passes a lateral side of the target at a speed lower than a speed of the host vehicle V when the target has been detected. After the host vehicle V has passed the lateral side of the target, the speed control unit 123 accelerates the host vehicle V up to the speed when the target has been detected.

5 Claims, 5 Drawing Sheets

(56) References Cited

U.S. PATENT DOCUMENTS

| | | | | |
|---|---|---|---|---|
| 2018/0345956 A1* | 12/2018 | Ohmura | ................ | B60W 30/09 |
| 2018/0345957 A1* | 12/2018 | Ohmura | .............. | B60W 30/143 |
| 2018/0370526 A1* | 12/2018 | Ohmura | .............. | B60W 30/146 |
| 2018/0370527 A1* | 12/2018 | Rachor | ................ | B60W 50/14 |
| 2020/0094829 A1* | 3/2020 | Ohmura | ................ | B60W 40/04 |

FOREIGN PATENT DOCUMENTS

| JP | 2010-167994 A | 8/2010 |
|---|---|---|
| JP | 2013-061797 A | 4/2013 |
| JP | 2016071566 A | 5/2016 |
| JP | 2016117319 A | 6/2016 |

OTHER PUBLICATIONS

Office Action for related JP App. No. 2017125249 dated Jun. 9, 2020. English translation provided; 6 pages.
Notice of Reasons for Refusal for related JP App No. 2017-125249 dated Dec. 22, 2020, 8 pgs.

* cited by examiner

VEHICLE SPEED CONTROL DEVICE

CROSS-REFERENCE TO RELATED APPLICATIONS

This application is a U.S. National Stage entry of PCT Application No: PCT/JP2018/022877 filed on Jun. 15, 2018, which claims priority to Japanese Patent Application No. 2017-125249, filed Jun. 27, 2017, the contents of which are incorporated herein by reference.

TECHNICAL FIELD

The present disclosure relates to a vehicle speed control device configured to control a speed of a vehicle.

BACKGROUND ART

There has been disclosed a technique for appropriately performing a transition from following traveling of traveling to follow a preceding vehicle to constant speed traveling of traveling at a set vehicle speed without causing a driver to feel uncomfortable (see Patent Literature 1).

CITATION LIST

Patent Literature

Patent Literature 1: JP-A-2004-114906

SUMMARY OF INVENTION

Technical Problem

In the technique disclosed in Patent Literature 1, a vehicle or a person outside a lane is not a target. Therefore, for example, when a host vehicle is traveling on a highway, the host vehicle passes a lateral side of a construction worker who performs work outside a lane of the highway or a vehicle stopped outside the lane of the highway still at the set vehicle speed. Therefore, the construction worker or a driver of the stopped vehicle outside the lane may be anxious.

Accordingly, the present disclosure has been made in view of the above circumstances. An aspect of the present disclosure provides a technique for reducing anxiety given to a person.

Solution to Problem

A vehicle speed control device according to the present disclosure includes a lane detection unit configured to detect a road outside line of a lane on which a host vehicle is traveling, a target detection unit configured to detect a target that is present outside the road outside line, and a speed control unit configured to control a speed of the host vehicle such that the host vehicle passes a lateral side of the target at a speed lower than a speed of the host vehicle when the target detection unit has detected the target.

For example, after the host vehicle has passed the lateral side of the target, the speed control unit accelerates the host vehicle up to the speed when the target has been detected. For example, the speed control unit limits accelerating of the host vehicle in a case where a distance between the host vehicle and the target is within a predetermined range.

The vehicle speed control device may further include a notification unit configured to notify decelerating of the host vehicle in a case where the target detection unit has detected the target. The vehicle speed control device may further include a rear side detection unit configured to detect a following vehicle traveling behind the host vehicle. For example, when the rear side detection unit has detected the following vehicle, the speed control unit does not decelerate the host vehicle even when the target detection unit has detected the target.

Advantageous Effects of Invention

According to the present disclosure, it is possible to reduce anxiety given to a person.

DESCRIPTION OF EMBODIMENTS

Outline of Embodiment

Figure 1A:
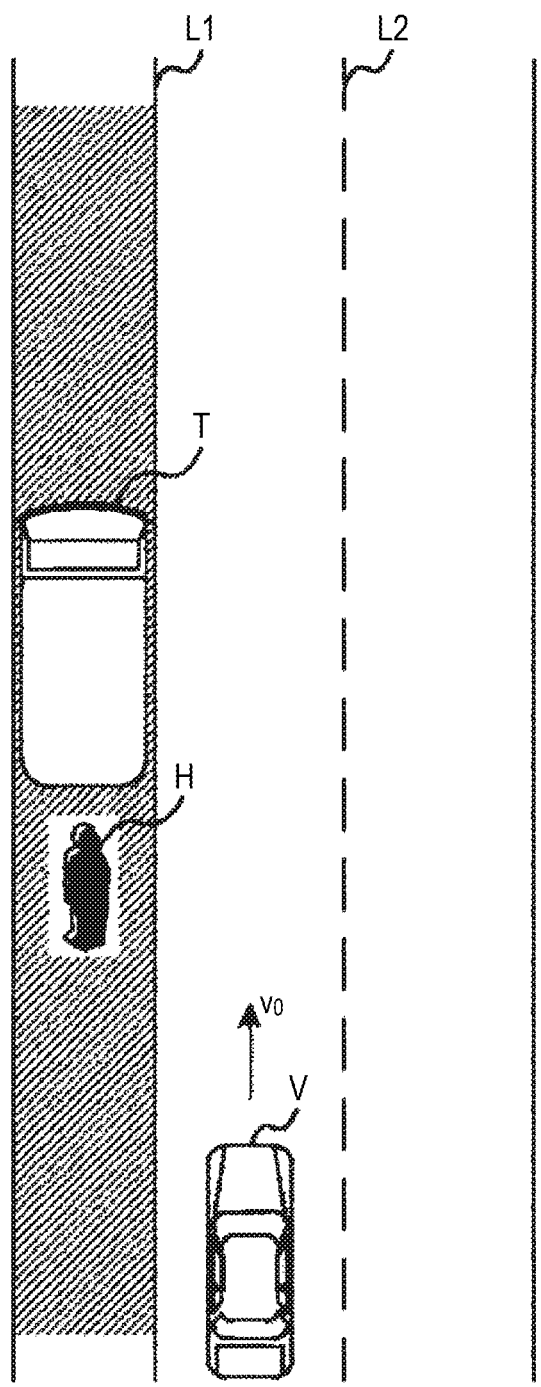
FIG. 1A illustrates an outline of an embodiment.
Figure 1B:
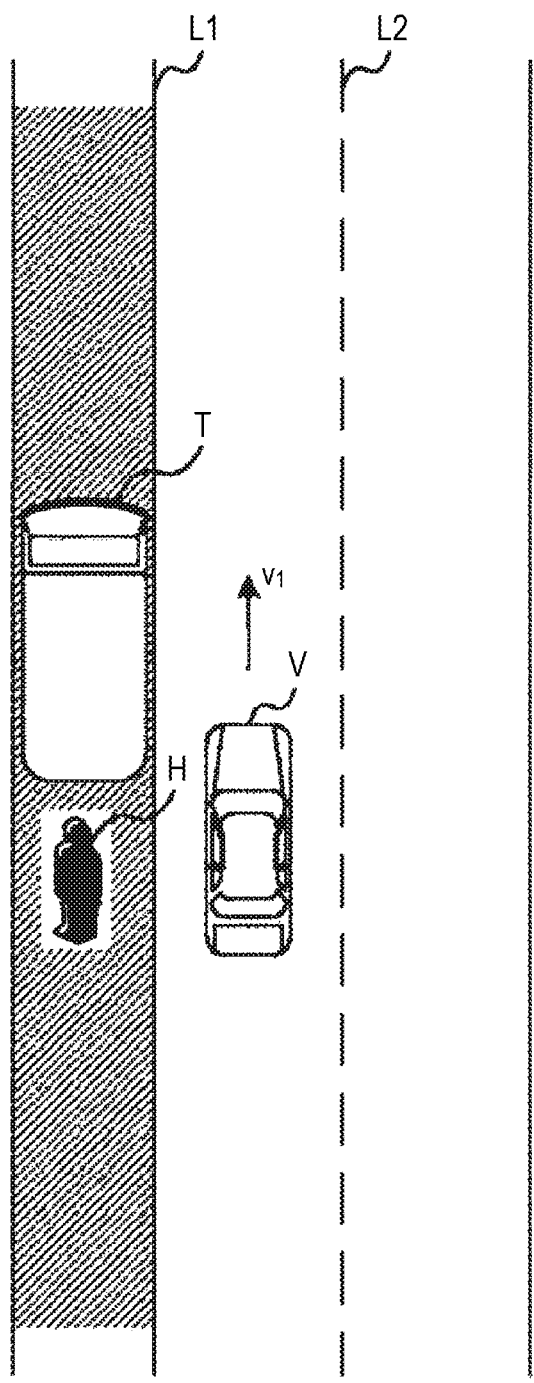
FIG. 1B illustrates the outline of the embodiment.

An outline of a vehicle V according to an embodiment will be described with reference to FIGS. 1A and 1B. FIGS. 1A and 1B illustrate the outline of the embodiment. In FIGS. 1A and 1B, for example, a work vehicle T that performs road construction stops in an area indicated by oblique lines outside a road outside line L1, and a worker H works in a vicinity of the work vehicle T. In FIG. 1A, the host vehicle V is traveling at a speed v0 in a traveling lane defined by the road outside line L1 and a center line L2. The host vehicle V detects the road outside line L1 using a mounted sensor, and detects the work vehicle T and the worker H that are present outside the road outside line L1.

When the worker H is detected, the host vehicle V controls a speed of the host vehicle V such that the host vehicle V passes a lateral side of the worker H at a speed lower than the speed v0 of the host vehicle V when the worker H has been detected. In FIG. 1B, the host vehicle V passes a lateral side of the worker H at a speed v1 lower than the speed v0. Accordingly, in a case where the host vehicle V passes the lateral side of the worker H, anxiety given to the worker H can be reduced. Then, after passing the lateral side of the worker H, the host vehicle V accelerates up to the speed v0 of the host vehicle V when the worker H has been detected.

<Configuration of Vehicle Speed Control Device According to Embodiment>

Figure 2:
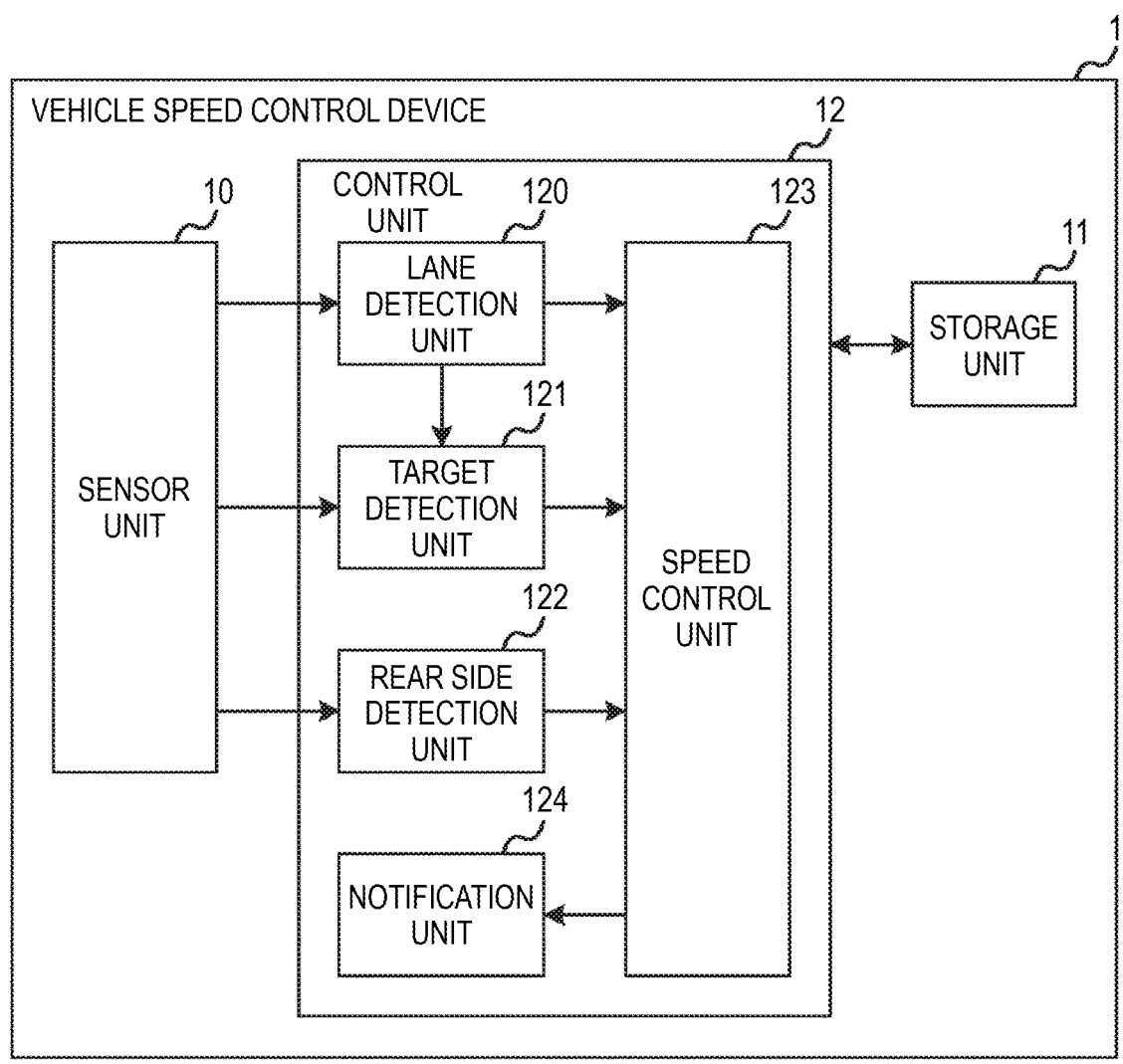
FIG. 2 shows a functional configuration of a vehicle speed control device according to the embodiment.

A functional configuration of a vehicle speed control device 1 mounted on the vehicle V according to the embodiment will be described with reference to FIG. 2. FIG. 2 shows the functional configuration of the vehicle speed control device 1 according to the embodiment. The vehicle speed control device 1 includes a sensor unit 10, a storage unit 11, and a control unit 12.

The sensor unit 10 is configured to detect an external environment of the vehicle V. The sensor unit 10 includes, for example, a camera configured to image a front side, a camera configured to image a rear side, and a millimeter wave radar. The sensor unit 10 may further include a laser radar, an ultrasonic sensor, or a Global Navigation Satellite System (GNSS) sensor.

The storage unit 11 is, for example, a Read Only Memory (ROM) or a Random Access Memory (RAM). The storage unit 11 is configured to store various programs for causing the control unit 12 to function. The storage unit 11 may store map information.

The control unit 12 is a calculation resource including a processor which is a Central Processing Unit (CPU) (not shown) or the like. The control unit 12 is configured to realize functions of a lane detection unit 120, a target detection unit 121, a rear side detection unit 122, a speed control unit 123, and a notification unit 124 by executing the programs stored in the storage unit 11.

The lane detection unit 120 is configured to detect the road outside line L1 of a lane on which the host vehicle V is traveling. For example, the lane detection unit 120 detects the road outside line L1 by analyzing an image imaged by the camera provided in the sensor unit 10. For example, the lane detection unit 120 converts the imaged image into a bird's-eye image, and then converts the imaged image into a black and white binarized image such that the road outside line L1 becomes white. The lane detection unit 120 detects the road outside line L1 by applying a model of the road outside line to the binarized image. The lane detection unit 120 is not limited thereto, and may detect the road outside line L1 using a known image analysis technique. The lane detection unit 120 notifies the detected road outside line L1 to the target detection unit 121. The lane detection unit 120 may notify the detected road outside line L1 to the speed control unit 123.

The target detection unit 121 is configured to detect a target that is present outside the road outside line L1. For example, the target detection unit 121 divides the image imaged by the camera provided in the sensor unit 10 into two areas with the road outside line L1 detected by the lane detection unit 120 being a boundary line, and specifies an area where the host vehicle V is not present as an outside of the road outside line L1. Then, the target detection unit 121 detects a person or a vehicle that is present outside the road outside line L1 as the target using a pattern matching method. The target detection unit 121 is not limited thereto, and may detect the target using the known image analysis technique. The target detection unit 121 may exclude, for example, a signboard, a sign, a street lamp, or an automatic speed control machine which are installed on a road shoulder from the target. The target detection unit 121 may detect a distance between the host vehicle and the detected target. The target detection unit 121 notifies the detected target and the distance between the host vehicle and the detected target to the speed control unit 123.

The rear side detection unit 122 is configured to detect a following vehicle that is traveling behind the host vehicle V. For example, the rear side detection unit 122 detects the following vehicle by analyzing a signal of the millimeter wave radar provided in the sensor unit 10. The rear side detection unit 122 may detect a distance between the host vehicle V and the following vehicle. The rear side detection unit 122 notifies the detected following vehicle and the distance between the host vehicle V and the following vehicle to the speed control unit 123.

The speed control unit 123 is configured to control the speed of the host vehicle V. Specifically, the speed control unit 123 controls the speed of the host vehicle V by controlling engine output or operating a brake. The speed control unit 123 controls the speed of the host vehicle V such that the host vehicle V passes a lateral side of the target at a speed lower than the speed of the host vehicle V when the target detection unit 121 has detected the target. The speed control unit 123 reduces the speed of the host vehicle V when a distance between the host vehicle V and the target becomes a predetermined threshold distance or less.

The predetermined threshold distance is a deceleration start reference distance to be referred to when the speed control unit 123 decelerates the host vehicle V to the speed v1 for not giving anxiety to the person detected by the target detection unit 121 or to a driver of the vehicle detected by the target detection unit 121. A specific value of the deceleration start reference distance may be determined in consideration of the speed v0 of the host vehicle V or a size of the host vehicle V, and is, for example, 80 meters. The speed control unit 123 may increase the deceleration start reference distance as the speed of the host vehicle V increases.

A specific value of the speed v1 for not giving anxiety to the target may be determined in accordance with the size of the host vehicle V, a type of a road on which the host vehicle V is traveling, or the speed v0 at which the host vehicle V is currently traveling. For example, the speed control unit 123 increases a deceleration amount of the host vehicle V as the speed v0 of the host vehicle V increases. Specifically, the speed control unit 123 may set the speed v1 for not giving anxiety to the target by a rate with respect to the speed v0 of the host vehicle V. For example, the speed v1 may be determined to be approximately 80% of the speed v0 at which the host vehicle V is currently traveling, and more preferably approximately 70% of the speed v0. For example, when the host vehicle V is traveling on a highway at a speed of 80 km per hour, the speed control unit 123 determines the speed v1 for not giving anxiety to the target as 64 km per hour.

The speed control unit 123 may limit accelerating of the host vehicle V when the host vehicle V is traveling within a predetermined range of the distance between the host vehicle V and the target. For example, the speed control unit 123 does not accelerate the host vehicle V during traveling within the predetermined range. The predetermined range is an acceleration limit range to be referred to when the speed control unit 123 controls the speed of the host vehicle so as not to give anxiety to the target. A specific value of the acceleration limit range may be determined in consideration of the speed v0 of the host vehicle V or the size of the host vehicle V, and is, for example, 80 meters. For example, the acceleration limit range is determined to be wider as the size of the host vehicle V is larger. The acceleration limit range may be different depending on whether the target detected by the target detection unit 121 is a person or a vehicle. Accordingly, in a case where the host vehicle V passes the lateral side of the target, the speed control unit 123 decelerates the host vehicle V or does not accelerate the host vehicle V, so that anxiety given to the target due to the host vehicle V can be reduced.

The speed control unit 123 may accelerate the host vehicle V up to the speed when the target is detected after the host vehicle V has passed the lateral side of the target. Specifically, the speed control unit 123 accelerates up to the speed when the target is detected at a predetermined acceleration. The predetermined acceleration may be an acceleration at which the driver of the host vehicle V does not feel uncomfortable, and may be determined by an experiment. Accordingly, the host vehicle V accelerates quickly after passing the target, so that it is possible to give a good drive feeling to the driver of the host vehicle V.

When the target has been detected, the speed control unit 123 may decrease the deceleration amount of the host vehicle V in a case where the following vehicle has been detected. Specifically, the speed control unit 123 may set the speed v1 for not giving anxiety to the target by the rate with respect to the speed v0 of the host vehicle V. For example, the speed v1 may be determined to be approximately 90% of the speed v0 at which the host vehicle V is currently traveling. When the rear side detection unit 122 has detected the following vehicle, the speed control unit 123 does not decelerate the host vehicle V even when the target detection unit 121 has detected the target. If the host vehicle V decelerates in a case where the following vehicle is traveling behind the host vehicle V, unnecessary deceleration of the following vehicle may occur. Since the speed control unit 123 does not decelerate the host vehicle V when the rear detection unit 122 has detected the following vehicle, the host vehicle V can prevent the following vehicle from being unnecessarily decelerated.

The notification unit 124 is configured to notify decelerating of the host vehicle V in a case where the target detection unit 121 has detected the target. For example, the notification unit 124 notifies the decelerating of the host vehicle V to the driver of the host vehicle V. Specifically, the notification unit 124 notifies a display unit 21 provided on a meter panel 2 of the host vehicle V of an instruction to display the deceleration. Accordingly, the driver of the host vehicle V can know a reason of the decelerating of the host vehicle V, so that the vehicle speed control device 1 can reduce the uncomfortable feeling given to the driver.

Figure 3A:
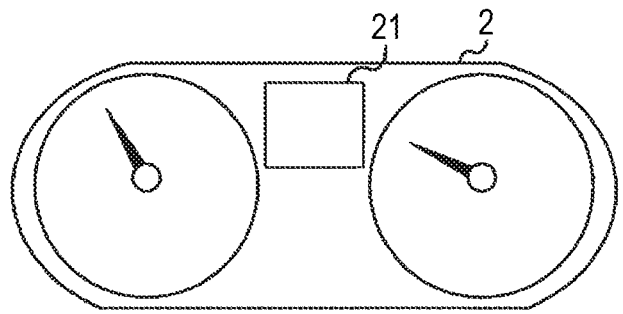
FIG. 3A illustrates a notification screen, and schematically illustrates a meter panel.
Figure 3B:
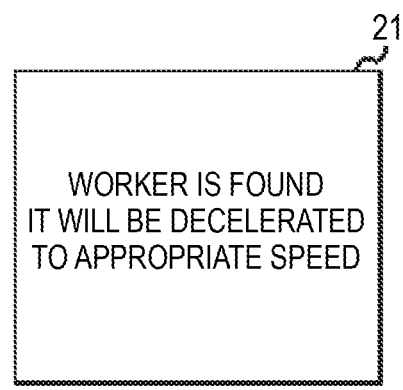
FIG. 3B illustrates the notification screen, and schematically illustrates a display screen displayed by a display unit.
Figure 3C:
FIG. 3C illustrates the notification screen, and schematically illustrates a display screen displayed by the display unit.

A specific method of the notification unit 124 notifying the decelerating of the host vehicle V will be described with reference to FIGS. 3A to 3C. FIGS. 3A to 3C illustrates a notification screen. FIG. 3A schematically illustrates the meter panel 2. The meter panel 2 includes the display unit 21. The display unit 21 is, for example, a liquid crystal display. The display unit 21 is configured to display various types of information based on the instruction from the notification unit 124.

FIG. 3B schematically illustrates a display screen displayed by the display unit 21. In FIG. 3B, it is assumed to notify the decelerating of the host vehicle V in a so-called cruise control state where the speed control unit 123 controls the speed of the host vehicle V. The notification unit 124 displays a display screen notifying that the worker H is found and notifying the decelerating of the host vehicle V. Accordingly, the notification unit 124 notifies the driver of the reason of the decelerating of the host vehicle V, so that the vehicle speed control device 1 can reduce the uncomfortable feeling given to the driver.

FIG. 3C schematically illustrates a display screen displayed by the display unit 21. In FIG. 3C, it is assumed that the notification is performed in a case where the speed of the host vehicle V is controlled by the driver. The notification unit 124 notifies that the worker H is found and displays a display screen of prompting the host vehicle V to decelerate. Accordingly, the vehicle speed control device 1 can enlighten the driver on safety driving.

The notification unit 124 may notify accelerating of the host vehicle V after the host vehicle V has passed the lateral side of the target. Specifically, the notification unit 124 notifies that the host vehicle V has passed a lateral side of the driver H and the work vehicle T and that the host vehicle V will be accelerated up to the speed when the target has been detected. Accordingly, the notification unit 124 notifies the driver of a reason of accelerating of the host vehicle V, so that the vehicle speed control device 1 can reduce the uncomfortable feeling given to the driver.

Figure 4:
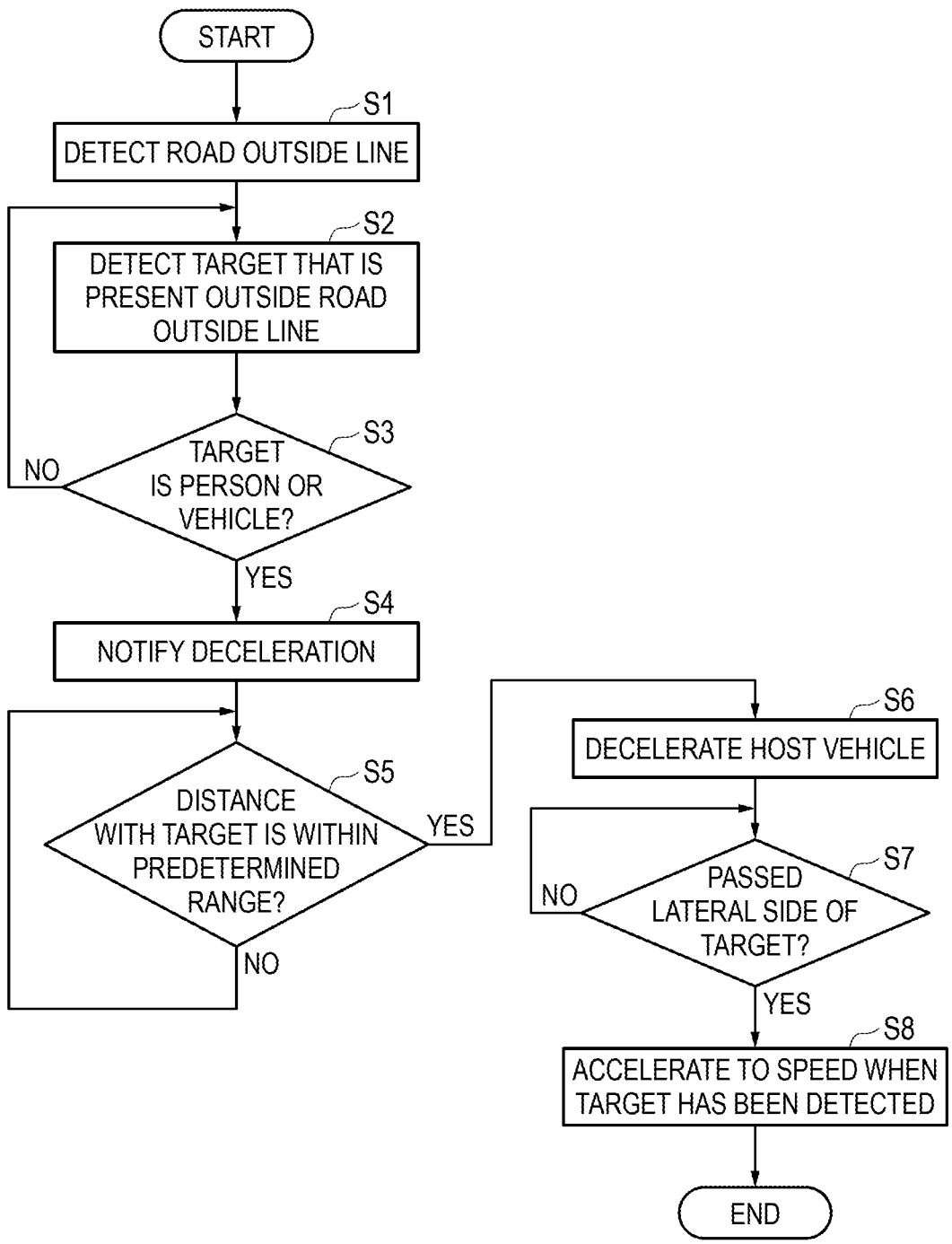
FIG. 4 is a flowchart of processing of passing a lateral side of a target.

Hereinafter, a flow of processing of the host vehicle V passing the lateral side of the target will be described with reference to FIG. 4. FIG. 4 is a flowchart of the processing of passing the lateral side of the target. First, the lane detection unit 120 detects the road outside line L1 of the lane on which the host vehicle V is traveling (step S1). The target detection unit 121 detects the target that is present outside the road outside line L1 detected by the lane detection unit 120 (step S2). The target detection unit 121 determines whether the detected target is a person or a vehicle (step S3). In a case where the target detection unit 121 determines that the detected target is not a person or a vehicle (No in step S3), the processing returns to step S2, and the target detection unit 121 detects the target that is present outside the road outside line L1.

If the target detected by the target detection unit 121 is a person or a vehicle (Yes in step S3), the notification unit 124 notifies decelerating of the host vehicle V (step S4). Then, the speed control unit 123 determines whether the distance between the host vehicle V and the target is within the predetermined range (step S5). When the speed control unit 123 determines that the distance between the host vehicle V and the target is not within the predetermined range (No in step S5), the speed control unit 123 waits until the distance becomes within the predetermined range.

When the speed control unit 123 determines that the distance between the host vehicle V and the target is within the predetermined range (Yes in step S5), the host vehicle V decelerates to the speed v1 lower than the speed v0 when the target has been detected (step S6). Subsequently, the speed control unit 123 determines whether the host vehicle V has passed the lateral side of the target (step S7). When the speed control unit 123 determines that the host vehicle V has not passed the lateral side of the target (No in step S7), the speed control unit 123 waits until the host vehicle V has passed the lateral side of the target. When the speed control unit 123 determines that the host vehicle V has passed the lateral side of the target (Yes in step S7), the speed control unit 123 accelerates the speed of the host vehicle V to the speed v0 when the target has been detected (step S8).

Effect of Embodiment

As described above, the lane detection unit 120 is configured to detect the road outside line L1, the target detection unit 121 is configured to detect the target outside the road outside line L1, and the speed control unit 123 is configured to control the speed of the host vehicle V such that the host vehicle V passes the lateral side of the target at the speed v1 lower than the speed v0 of the host vehicle V when the target has been detected. Accordingly, the vehicle speed control device 1 according to the embodiment can reduce anxiety given to the worker H who works outside the road outside line L1 or the driver of the work vehicle T that is stopped outside the road outside line L1.

The present disclosure has been described using the embodiment. However, the technical scope of the present disclosure is not limited to the scope described in the above-described embodiment, and various modifications and changes can be made within the scope thereof. For example, the specific embodiment of distributing and integrating the device is not limited to the above-described embodiment, and all or a part thereof may be functionally or physically distributed and integrated in arbitrary units. New embodiments generated by any combination of a plurality of embodiments are also included in the embodiment of the present disclosure. Effects of the new embodiments generated by the combination also have the effect of the original embodiment.

The present application is based on Japanese Patent Application JP-A-2017-125249 filed on Jun. 27, 2017, contents of which are incorporated herein by reference.

INDUSTRIAL APPLICABILITY

The vehicle speed control device according to the present disclosure is useful in that anxiety given to the person can be reduced by controlling the speed of the host vehicle such that the host vehicle passes the lateral side of the target at the speed lower than the speed of the host vehicle when the target detection unit has detected the target.

REFERENCE SIGNS LIST 1 vehicle speed control device
2 meter panel
10 sensor unit
11 storage unit
12 control unit
21 display unit
120 lane detection unit
121 target detection unit
122 rear side detection unit
123 speed control unit
124 notification unit

The invention claimed is:

1. A vehicle speed control device comprising:
a controller configured to:
    detect a road outside line of a lane on which a host vehicle is traveling;
    detect a target that is present outside the road outside line; and
    control a speed of the host vehicle such that the host vehicle passes a lateral side of the target at a speed lower than a speed of the host vehicle when the target has been detected,
wherein the controller is configured to control the speed of the host vehicle such that the host vehicle decelerates to a predetermined speed lower than the speed of the host vehicle when the target has been detected, the predetermined speed being set by a rate with respect to the speed of the host vehicle when the target has been detected, and
wherein the rate with respect to the speed of the host vehicle, when the target vehicle is detected, is set such that the controller increases a deceleration amount of the host vehicle as the speed of the host vehicle e, when the target vehicle is detected, increases.

2. The vehicle speed control device according to claim 1, wherein, after the host vehicle has passed the lateral side of the target, the controller accelerates the host vehicle up to the speed when the target has been detected.

3. The vehicle speed control device according to claim 1, wherein the controller limits accelerating of the host vehicle in a case where a distance between the host vehicle and the target is within a predetermined range.

4. The vehicle speed control device according to claim 1, wherein the controller is further configured to:
    notify decelerating of the host vehicle in a case where the target has been detected.

5. The vehicle speed control device according to claim 1, wherein the controller is further configured to:
    detect a following vehicle traveling behind the host vehicle, and
wherein when the following vehicle has been detected, the controller does not decelerate the host vehicle even when the target has been detected.

* * * * *